Oct. 19, 1965  M. BROVERMAN  3,213,397
ELECTRICAL WINDING SPOOL FOR ELECTRICAL APPARATUS
Filed April 28, 1961  6 Sheets-Sheet 3

Inventor:
Michael Broverman,
by Gilbert P. Tarleton
His Attorney.

Oct. 19, 1965 M. BROVERMAN 3,213,397
ELECTRICAL WINDING SPOOL FOR ELECTRICAL APPARATUS
Filed April 28, 1961 6 Sheets-Sheet 4

Inventor,
Michael Broverman,
by Gilbert P. Tarleton
His Attorney.

Oct. 19, 1965     M. BROVERMAN     3,213,397
ELECTRICAL WINDING SPOOL FOR ELECTRICAL APPARATUS
Filed April 28, 1961     6 Sheets-Sheet 6

Inventor,
Michael Broverman,
by Gilbert P. Tarleton
His Attorney.

United States Patent Office 3,213,397
Patented Oct. 19, 1965

1

3,213,397
ELECTRICAL WINDING SPOOL FOR ELECTRICAL APPARATUS
Michael Broverman, Pittsfield, Mass., assignor to General Electric Company, a corporation of New York
Filed Apr. 28, 1961, Ser. No. 106,375
10 Claims. (Cl. 336—60)

This invention relates to electrical apparatus and more particularly to improvements in the insulation structure of the coil portion of the core and coil assembly of an electrical transformer.

While in no wise limited thereto, the invention is particularly useful in pole type distribution transformers which step down distribution voltages to standard household utilization voltage and which are used by the hundreds of thousands of the lines of public and private electric power supply companies. Heretofore such transformers have included cellulosic insulation in the form of pressboard winding spools and kraft paper winding layer insulation. However, such insulation is subject to progressively rapid deterioration as its operating temperature increases.

A major cause of this deterioration is the evolution of water from the material at higher operating temperatures. This water produces other undesirable side effects such as impairment of the insulation strength of the transformer oil in which the core and coils are often immersed and deterioration of the insulating enamel or varnish with which the coil conductors are often coated. While substantial improvement has been obtained by cyanoethylation of the cellulosic material so as to reduce its water formation, this material is still the weakest link in the insulation structure of the transformer.

Accordingly, it is an object of this invention to provide a novel transformer construction which contains no cellulosic insulation.

A primary feature of the invention is the use of a plurality of nested molded plastic spools of novel construction for supporting and insulating the coils of the transformer from each other and from their associated magnetic core.

Other objects and advantages of the invention will become apparent as the description proceeds.

The invention will be better understood from the following description taken in connection with the accompany drawings and its scope will be pointed out in the appended claims.

2

Figure 1:
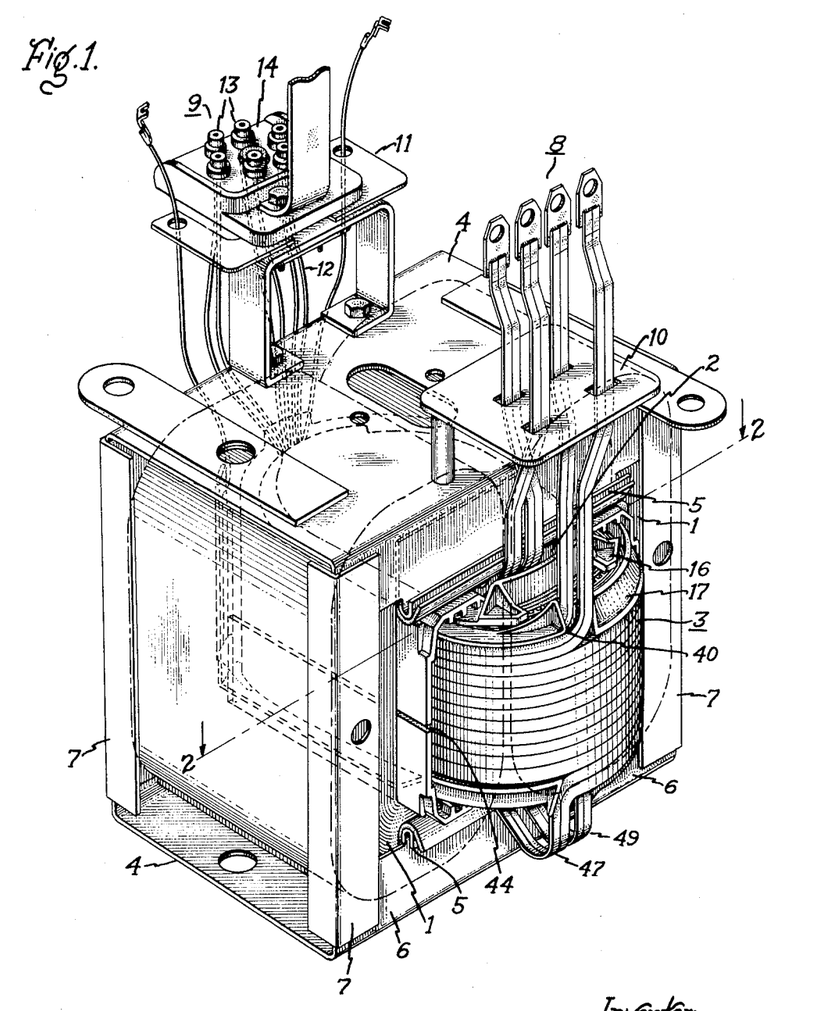
FIG. 1 is a perspective view partly in phantom of a pole type distribution transformer core and coil assembly embodying the invention.

Referring now to the drawings and more particularly to FIG. 1, therein is shown a transformer core and coil assembly adapted for operation in a closed oil filled transformer tank (not shown). However the use of an oil filled tank is not essential, and it is contemplated that the assembly may be encapsulated in a hardened resin, such as epoxy resin. The core portion of the assembly consists of two curved iron loops 1 each comprising a plurality of radially nested laminations of suitable material such as grain oriented silicon steel. These two core loops 1 are mounted with respective straight sides back to back so as to constitute a central winding leg 2. Linking the core loops 1 by surrounding the winding leg 2 is a coil assembly 3 which from one point of view can be considered as filling the central space or window of each of the core loops 1, and from another point of view can be considered as having a central space or window which is filled by the core leg 2. The core and coil assembly is held together by top and bottom clamps 4 which are in the form of U-shaped sheet metal members having bent or rolled over edges 5 on their sides 6. The top and bottom clamps 4 are held together by sheet metal angle bracket members 7 welded at the ends to the sides 6 of the U-shaped clamps 4. The rolled over edges 5 of the sides of the clamps 4 serve as clamping members for the coil assembly 3.

The electrical terminals of the coil assembly 3 comprise a set of low voltage winding terminals 8 at one end of the coil portion and a set of high voltage winding terminals 9 at the opposite end of the coil portion. The low voltage terminals 8 are supported and spaced from each other by a suitable bracket of insulating material 10 and the high voltage terminals 9 are likewise supported by a suitable insulating bracket 11. For the purpose of changing the transformer ratio, there are provided a plurality of intermediate taps 12 from the high voltage winding which terminate respectively at fixed contacts 13 of a suitable ratio adjuster switch 14.

Figure 2:
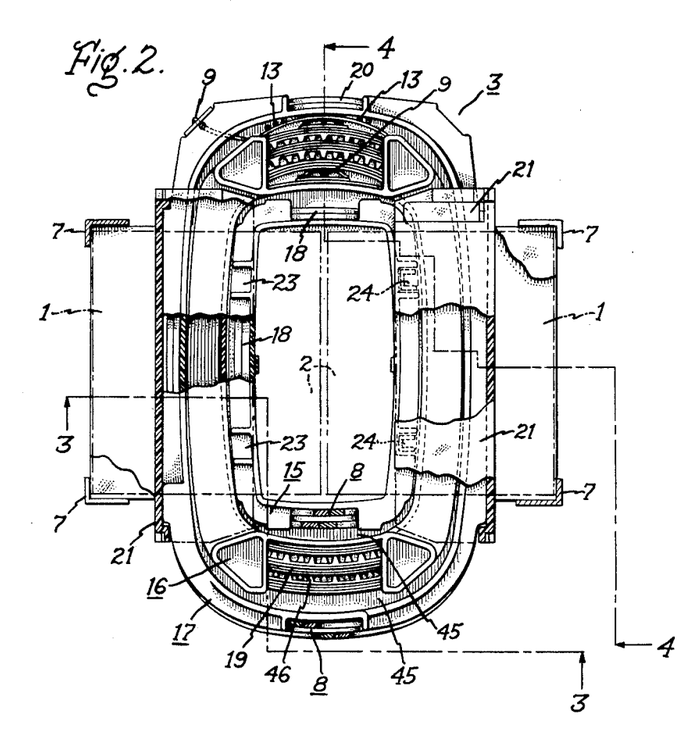
FIG. 2 is a partly broken away horizontal sectional view in the plane of line 2—2 of FIG. 1 viewed in the direction of the arrows associated therewith.
Figure 3:
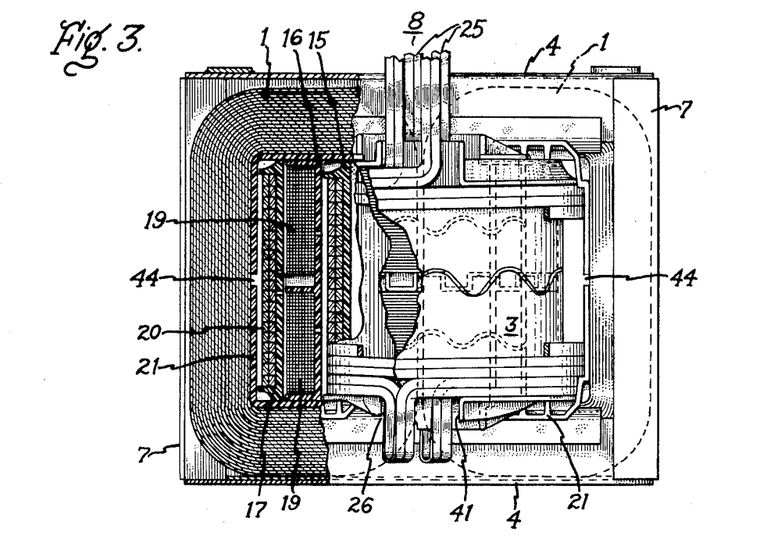
FIG. 3 is an elevation view of the low voltage end of the assembly of FIG. 1, partly in section taken on line 3—3 of FIG. 2.
Figure 4:
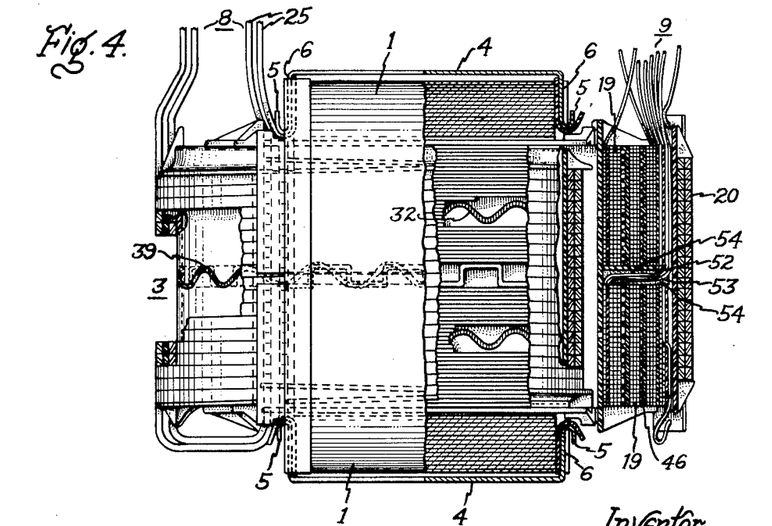
FIG. 4 is a side elevation view of the assembly of FIG. 1, partly in section taken on line 4—4 of FIG. 2.

The coil portion 3 is shown most clearly in FIGS. 2 and 3 and comprises generally three coils supporting spools 15, 16 and 17. These spools are composed of non-cellulosic insulating material such for example as molded hardened plastic insulation. For example, they may be constructed of glass fabric impregnated polyester resin. They are mounted concentrically and coaxially, the spool 15 being a support for an inner low voltage winding section 18, the spool 16 being the support for a high voltage winding 19, and the spool 17 being the support for an outer low voltage winding section 20.

Figure 5:
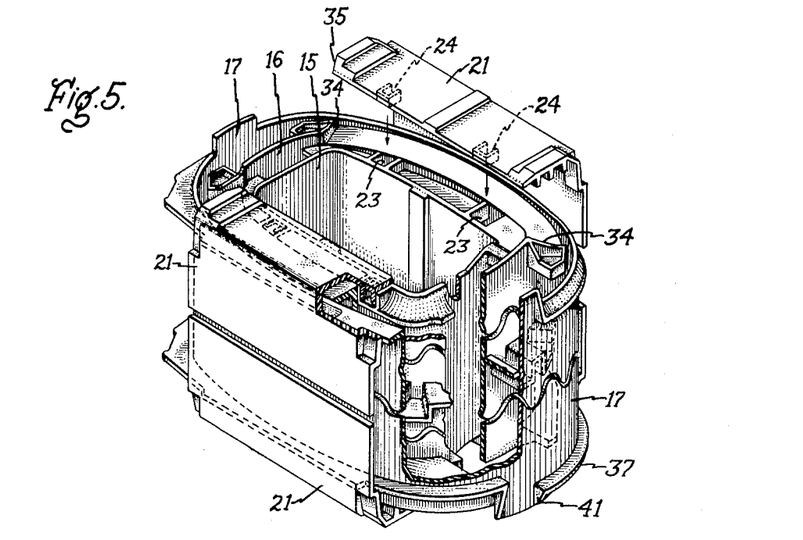
FIG. 5 is a partially exploded, partially broken away perspective view of the spool assembly for the coils.
Figure 6:
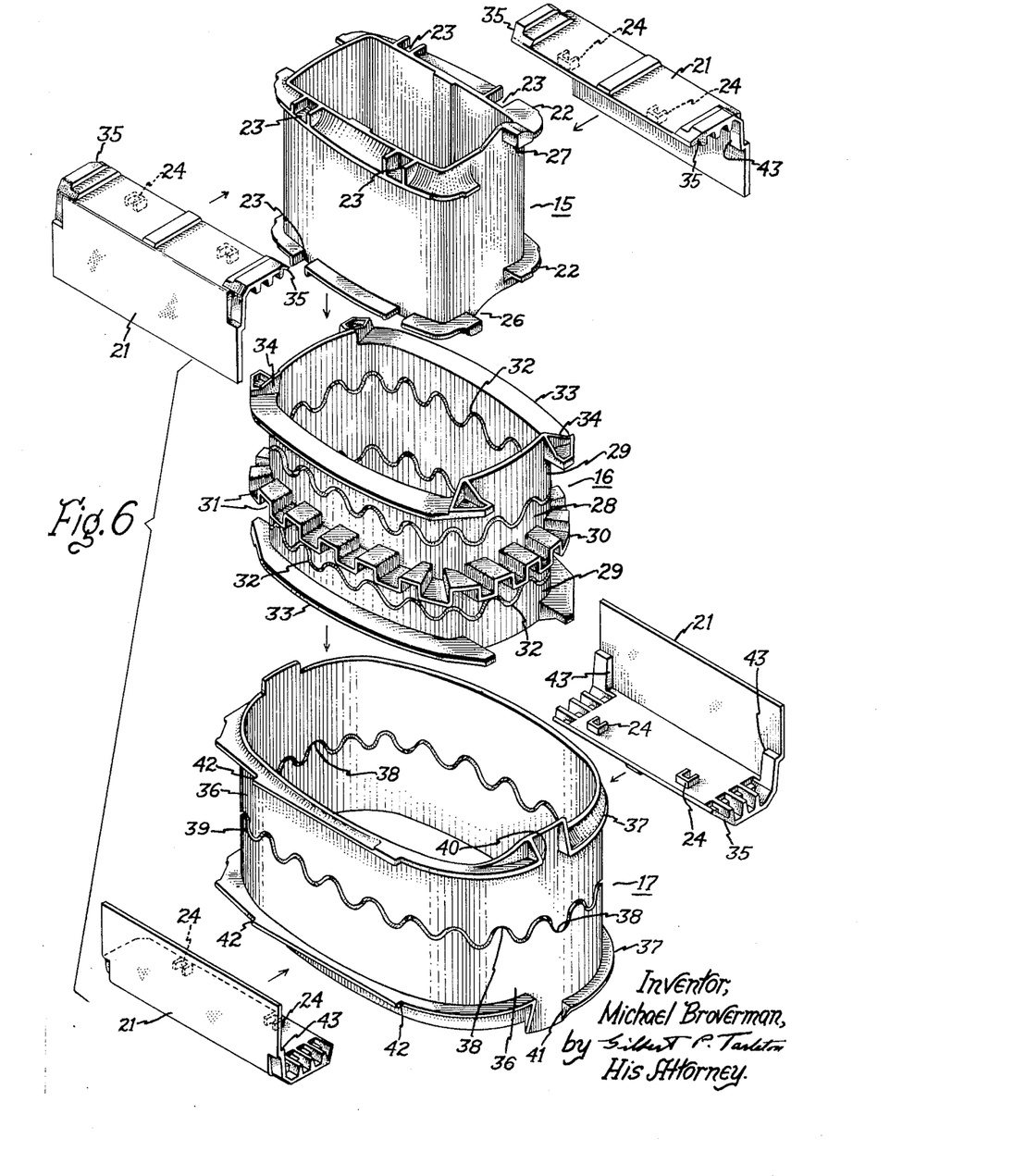
FIG. 6 is a fully exploded perspective view of the spool assembly of FIG. 5.

In addition to the three nested spools 15, 16, and 17, the coil supporting and insulating assembly also comprises four shield members 21 shown most clearly in FIGS. 5 and 6. These shield members 21 not only serve to insulate the outer low voltage winding section 20 from the loops 1 core, but they also serve to interlock the spools so as to prevent relative motion thereof and also to provide proper spacing between the spools.

Figure 7:
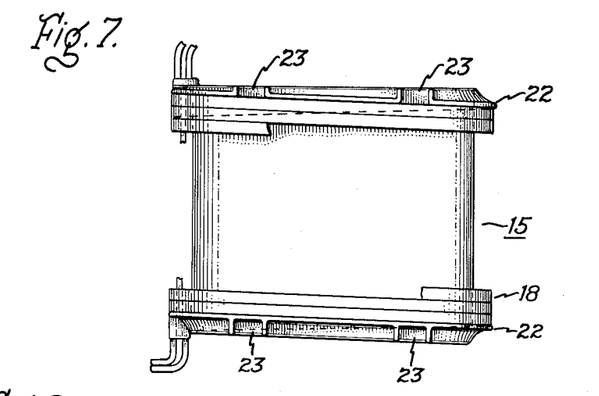
FIG. 7 is a side elevation view of the unitary inner low voltage spool.
Figure 8:
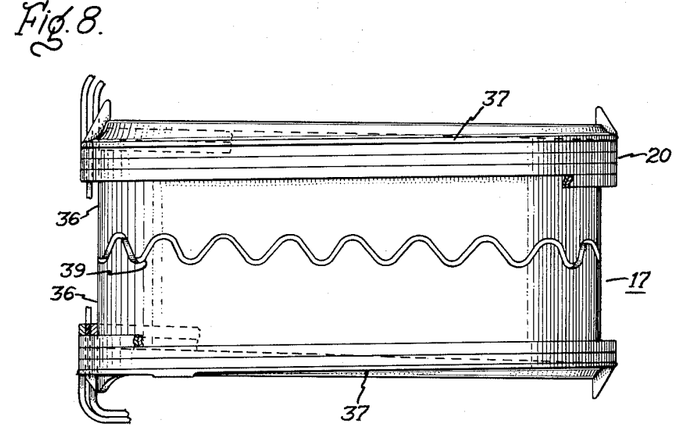
FIG. 8 is a side elevation view of the two part outer low voltage spool.
Figure 9:
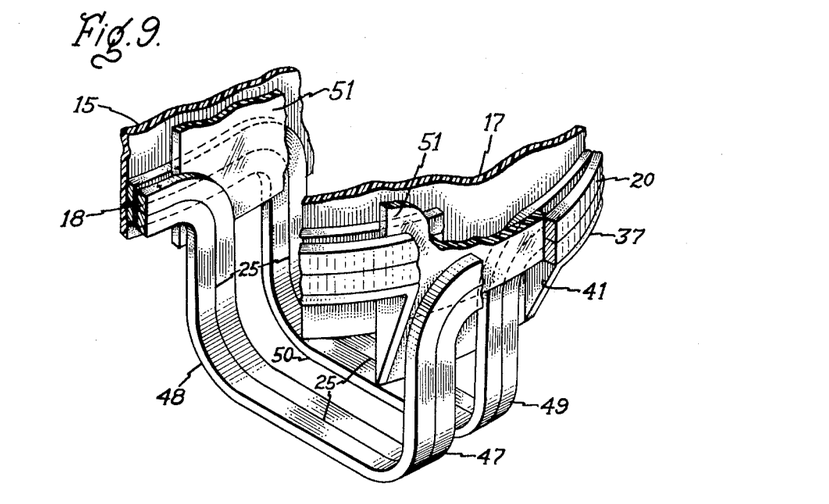
FIG. 9 is an enlarged detail perspective view of the interconnection between the "starts" of the inner low voltage coils and the "finishes" of the outer low voltage coils.

The inner low voltage spool 15, as shown most clearly in FIGS. 6 and 7, may be of unitary construction. It has integral end flanges 22 which are molded to have an angle to the axis of the spool corresponding to the pitch of the conductor winding 18 which is supported by the spool. These flanges also are provided with openings 23 for receiving interlocking projections 24 on the shield members 21. The portion 18 of the low voltage winding which is supported by the inner spool 15 is shown most clearly in FIG. 9 as consisting of two separate layers of split or two-stranded rectangular copper conductor 25 which is wound directly on the spool 15. In the winding operation for the spool 15, the winding may be considered as starting at the point 26 (FIGS. 3 and 6) of the lower flange 22 and may proceed around the spool in a counterclockwise direction as viewed in FIG. 6 so that this portion of the low voltage winding finishes at the edge 27 of the upper flange 22. The two two-strand conductors 25 are, of course, radially superposed in the winding operation so that one two-strand elongated conductor constitutes the inner layer and the other one constitutes the outer layer, providing a multilayer coil with multi-turns in each layer.

The high voltage spool 16 as shown most clearly in FIG. 6 consists of three parts, namely, a central part 28 and upper and lower or end parts 29 which may be identical, i.e. produced in the same mold. The reason the high voltage spool 16 is made in a number of parts instead of as a unit as is the low voltage spool 15 is that it has been found that it is very difficult, if not impossible, to mold spools of any appreciable size without having gas pockets or voids in the material composing them. This is because the material tends to harden rapidly and if it has to travel an appreciable distance during the molding operation, this travel plus the hardening effect tends to trap air or otherwise form a nonhomogeneous insulating structure. Consequently in high stress electrical fields such as are associated with the high voltage winding of a transformer, these pockets or discontinuities tend to result in spots or zones of ionization which ultimately lead to breakdown of the insulation. Therefore, in order to avoid this and reduce the distance that the plastic material when in a fluid state, has to travel during molding operation, the parts of the spool are made smaller than the entire spool.

As shown most clearly in FIG. 6 the central portion 28 of the high voltage spool 16 also has an integral radially extending central flange 30 which is of stepped or zig zag or wavy construction so as to provide a series of radially extending ducts or grooves 31, alternate ones of which are open respectively at the top and bottom. By having the mold divided into two parts in a plane through the center of the flange 30 so that the mold halves can be separated in a direction parallel to the axis of the spool 16, the ducts or grooves 31 can extend generally radially at all points. The contiguous edges of the body portions of the members 28 and 29 have generally mating wavey or zig zag circumferential configurations 32. The upper and lower duplicate portions 29 of the high voltage spool 16 also have flanges 33 with a taper or angle corresponding to the pitch of the high voltage coil sections. As shown most clearly in FIG. 3, the high voltage winding actually consists of two multi-layer coils 19 of elongated conductor which occupy respectively the spaces between the central flange 30 of the central portion 28 and the end flanges 33 of the duplicate portions 29. Because of the multi-unit construction of the high voltage spool 16, the high voltage winding coil sections can conveniently be preformed or pre-wound and then assembled with the portions of the spool 16. In such construction, the axial height or length of the high voltage coil sections is slightly greater than the minimum distance between the central flange and the end flanges so that the coils abutting flanges 30 and 33 actually separate slightly, in an axial direction, the end portions 29 of the spool 16 from the central portion 28 so that the generally mating zig zag or scalloped edges 32 of the spool parts are slightly separated axially to constitute a sinuous gap between them, with the gap extending circumferentially about the high voltage spool 16. This is for the purpose of permitting transformer oil in the usual tank in which the core and coil assembly is immersed to penetrate the spaces between the adjacent edges of the parts 28 and 29 of the high voltage spool 16 so as to provide high dielectric strength and minimize the trapping of ionizable air between the parts which might occur if they were allowed to come into contact.

The flanges 33 are provided with integral beveled projections 34 which are engaged by beveled edges 35 on the shields 21 so as to radially space the spool 16 relative to the spool 15.

The outer low voltage spool 17 being between the outer low voltage winding section and the high voltage winding on the high voltage spool 16 is subject to higher electrical field stresses than is the inner low voltage spool 15 which is merely subjected to the relatively low stress between the inner low voltage winding portion and the core which is conventionally at ground potential. Consequently the outer low voltage spool 17 is made in a plurality of parts for the same reason that high voltage spool 16 is and, as shown, it comprises duplicate upper and lower parts 36 which have a beveled flange 37 and a wavey or zig zag circumferential configuration at the contiguous edges of their body portions. At each end of each part 36 where end ducts or enlarged spacing 45 (FIG. 2) between windings exists, there is a point 38 in the wavey edge which extends further than the others so that when the two parts are reversed end for end and brought together there will be two points of interference fit at each end providing a four point contact, which serves to axially separate the parts to produce a sinuous gap 39 or spacing between the contiguous end portions the gap extending circumferentially about the low voltage spool 17. This is for the same general purpose as the gaps in the high voltage spool 16, namely, to permit insulating oil to fill the space between the adjacent edges of the body portions of the parts 36 for providing high strength electrical insulation. The winding portion on the outer low voltage spool 17 is of the same kind as on the inner low voltage spool 15 and likewise consists of an inner layer and an outer layer of elongated two-stranded rectangular copper conductors. However, this portion of the low voltage winding may conveniently be considered as starting at the point 40 and being wound in a clockwise direction around the spool 17 as viewed, for example, in FIG. 1 so that the finish of the winding is at the point 41 on the lower flange 37 (FIG. 6). Thus low voltage winding 20 will be a multi-layer coil having multi-turns per layer similar to the low voltage winding 18.

The reason the mating or adjacent edges of the body portions of the sections of the high voltage spool 16 and the low voltage spool 17 are wavey or zig zag is so as to provide a radially inward support, which extends circumferentially about the body portion, for the winding conductors mounted on these spools and so as to prevent these conductors from falling into the gaps between those edge portions.

The flanges 37 of the outer low voltage spool 17 are provided with shoulders 42 which are engaged by shoulders 43 on the shields 21 for the purpose of interlocking the outer low voltage spool 17 with the shield portions 21 and therefore with the other spools 15 and 16 which as previously described are also interlocked with the shields 21. In this manner all three of the nested spools are mounted in fixed positions relative to each other in all directions.

The four shield members 21 may be identical, forming a quadruplicate set, that is to say they may be produced from the same mold and they each have a right angularly extending skirt portion extending along the outer surface of the outer low voltage winding section between it and the core sections 1 for providing proper clearance and insulation. It will be noted that as shown in FIGS. 1 and 3 gaps 44 exist between the adjacent ends or edges of these skirts for the purpose of permitting insulating oil to fill these gaps and provide continuous high strength insulation free of ionizable voids or pockets of trapped air or gas.

As shown most clearly in FIG. 2 in the preferred form of the winding spools shown as straight-sided elongated ovals, there is very little radial clearance or spacing between the coils and their spools at the sides of the coils and spools where they are in the core windows and this is for the purpose of providing a high space factor in these windows. However, at the opposite ends of the coil assembly, the radial spacing is greater so as to provide ducts 45 for insulating oil to circulate and carry off heat from the coils. Likewise, certain of the layers of the high voltage coils are radially spaced from each other in these end portions by spacer members 46 inserted between those layers, these spacer members being of non-cellulosic flexible sheet insulation provided with integral projections so that axially extending radial gaps or ducts are provided for permitting the insulating oil to penetrate between the layers of the high voltage windings at the ends. Thus oil can enter and leave the ducts provided by the spacers 46 at the center of the high voltage winding through the ducts 31 in the central flange 30 of the part 28 of the high voltage spool 16.

The upper and lower coils constituting the sections or portions of the high voltage winding are usually connected in series. As will be understood the high voltage winding 19 will usually be a multi-layer coil having multi-turns in each layer as is indicated in FIG. 3 of the drawing. One reason the high voltage winding is divided into sections is because no layer insulation as such is used, the only insulation between layers being the same as the turn to turn insulation. This insulation is an enamel or varnish coating on the conductor. Dividing the winding into two sections of half the axial length of spool 16 halves the layer to layer voltage. The connection 52 between the upper and lower high voltage coils, as well as certain tap leads 53 from the lower coil extend through one of the ducts 31 in the center flange 30 of the high voltage spool 16. In order to hold this connection 52 and the tap leads 53 firmly in place the rest of the duct 31 may be filled with a putty-like substance 54 of any suitable composition such as a mixture of epoxy resin and clay.

The coil portions constituting the low voltage winding sections are shown interconnected for balanced reactance. Thus, as shown most clearly in FIG. 9, the finish 47 of the outer layer of the outer coil is connected directly in series with the start 48 of the outer layer of the inner low voltage coil, similarly the finish 49 of the inner layer of the outer low voltage coil is connected directly to the start 50 of the inner layer of the inner low voltage coil. Thus a layer of the low voltage coil which is farthest away from the high voltage winding is in each case directly connected in series with another layer which is closest to the high voltage winding for the purpose of producing balanced reactance between the two sections of the low voltage winding. Because of the larger size, and hence greater stiffness, of the conductor of the low voltage winding it is more difficult to wind it without damaging its enamel insulation and therefore rather than relying on it for layer insulation, it is safer to use sheets 51 of flexible semi-cured resin filled glass cloth layer insulation.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In combination, an electrical coil and a spool for supporting said coil, said spool having an integral radially extending central flange formed thereon, said coil being disposed on said spool and in abutting relationship to the sides of said flange, said flange having a stepped construction providing grooves therein, alternate ones of which are open on opposite sides of said flange, to provide cooling ducts for said coil, said grooves radially across said flange, and said spool and flange being formed from electrical insulating material.

2. In combination, an electrical coil and a spool for supporting said coil, said spool having an integral radially extending central flange formed thereon, said coil being disposed on said spool and in abutting relationship to the sides of said flange, said flange having a stepped construction providing therein, alternate ones of which are open on opposite sides of said flange, to provide cooling ducts for said coil, said grooves extending radially across said flange, an electrical lead connected to said coil, said lead being disposed in one of said grooves and extending to said coil between said flange and coil, and said spool and flange being formed from electrical insulating material.

3. An insulating and supporting spool for an elongated electrical conductor to be wound thereon, said spool comprising axially separated molded plastic sections with interfitting scalloped edges separated axially to provide a wavy circumferential gap for filling with fluid insulation, the wavy configuration of said gap providing radially inward circumferentially extending support for said conductor and preventing the latter from entering said gap.

4. An axially split insulating and supporting spool for an elongated electrical conductor to be wound thereon, said spool comprising duplicate halves of molded plastic material, the axially adjacent edges of said halves having a wavy circumferential configuration with four extending points such that said halves interfit with a four point contact which produces a wavy gap between the duplicate halves for filling by fluid insulation, said wavy gap providing radially inward support for said conductor and preventing it from entering said gap.

5. An insulating and supporting structure for the conductor windings of a pole type distribution transformer comprising ten pieces of molded glass reinforced synthetic resin of which there is one set of quadruplicates, two different sets of duplicates and two different units, one of said units being a spool for an inner low voltage winding, the other of said units being an axially central section of a spool for a high voltage winding of which the members of one of said sets of duplicates comprise axially opposite end sections, the other set of duplicates being axially opposite halves of a spool for an outer low voltage winding, said three spools being of substantially equal axial length and being nested with the spool for the high voltage winding between the other two spools, the set of quadruplicate pieces being disposed in diametrically opposite pairs across opposite ends of said spools, and surfaces on said quadruplicate pieces interlocking with complementary surfaces on the ends of all of said spools for maintaining said spools concentrically coaxial and preventing relative rotation of said spools about their common axis, said quadruplicate pieces having integral spacer portions extending perpendicularly therefrom on the outside of and parallel to the axis of the outer spool.

6. A transformer comprising a core and coil assembly for placement in an oil filled tank, the coil portion of said assembly comprising three concentric coaxial hardened plastic winding spools each of which carries a multilayer multi-turn per layer coil of elongated conductor whose turn to turn and layer to layer insulation is provided by a coating of synthetic resin enamel on the conductor, the coil on the middle spool comprising one of the windings of said transformer, and the coils on the other two spools being interconnected to comprise another winding of said transformer, said middle spool having an integral radially extending central flange, said flange having cooling ducts for said winding, said cooling ducts being formed by a plurality of radially extending grooves on opposite sides of said flange.

7. A transformer comprising a core and coil assembly for placement in an oil filled tank, the coil portion of said assembly comprising three concentric coaxial hardened plastic winding spools each of which carries a multilayer multi-turn per layer coil of elongated conductor whose turn to turn and layer to layer insulation is provided by a coating of synthetic resin enamel on the conductor, the coil on the middle spool comprising one of the windings of said transformer and the coils on the other two spools being interconnected to comprise another winding of said transformer, said spools being straight sided elongated ovals in radial cross section, adjacent spools having narrow radial clearance between their straight sides to provide high core window space factor and having wide radial clearance between their ends to provide ducts for cooling oil and winding leads, the leads of each winding extending respectively from opposite ducts.

8. A transformer comprising a core and coil assembly for placement in an oil filled tank, the coil portion of said assembly comprising three concentric coaxial hardened plastic winding spools, each of which carries a multi-layer multi-turn per layer coil of elongated conductor whose turn to turn and layer to layer insulation is provided by a coating of synthetic resin enamel on the conductor, the coil on the middle spool comprising one of the windings of said transformer and the coils on the other two spools being interconnected to comprise another winding of said transformer, the middle spool having a central radial flange with integral radial ducts alternate ones of which are open on opposite sides of said flange, said flange separating the coil on the middle spool into two sections, and axially extending radial spacer means between layers of said sections for producing axially extending ducts in said sections communicating with the radial ducts in said flange.

9. A transformer comprising a core and coil assembly for placement in an oil filled tank, the coil portion of said assembly comprising three concentric coaxial hardened plastic winding spools, each of which carries a multi-layer multi-turn per layer coil of elongated conductor whose turn to turn and layer to layer insulation is provided by a coating of synthetic resin enamel on the conductor, the coil on the middle spool comprising one of the windings of said transformer and the coils on the other two spools being interconnected to comprise another winding of said transformer, said spools being straight sided elongated ovals in radial cross section, adjacent spools having narrow radial clearance between their straight sides to provide high core window space factor and having wide radial clearance between their ends to provide ducts for cooling oil and winding leads, the leads of each winding extending respectively from opposite ducts, the middle spool having a central radial flange with integral radial ducts alternate ones of which are open on opposite sides of said flange, said flange separating the coil on the middle spool into two sections and axially extending radial spacer means between layers of said sections for producing axially extending ducts in said sections communicating with the radial ducts in said flange.

10. A non-cellulosic insulation pole type distribution transformer comprising a core and coil assembly for placement in an oil filled tank, the coil portion of said assembly comprising three concentric coaxial hardened plastic winding spools, the middle spool having a central flange in addition to its end flanges, a high voltage conductor winding comprising two pre-formed multi-layer multi-turn per layer serially connected sections mounted on said middle spool respectively between its central flange and its end flanges, the entire turn to turn and layer to layer insulation of said sections being a synthetic resin coating on said high voltage conductor, a low voltage conductor winding comprising two serially connected balanced reactance low voltage sections each distributed over both the inner and outer spools, each low voltage section comprising a multi-turn single layer on each of the latter spools, the two layers on each spool being wound one on top of the other and each extending the full axial length of its spool, the radially inward layer on one spool being serially connected with the radially inward layer on the other spool to constitute one low voltage section, the radially outward layer on one spool being serially connected with the radially outward layer on the other spool to constitute the other low voltage section, the turn to turn insulaion and the layer to layer insulation of said low voltage sections being a synthetic resin enamel coating on said low voltage conductor.

References Cited by the Examiner

UNITED STATES PATENTS

| | | | |
|---|---|---|---|
| 289,164 | 11/83 | Strohm | 336—198 |
| 459,510 | 9/91 | Knowles | 336—80 X |
| 1,017,348 | 2/12 | Murray | 336—60 X |
| 1,317,003 | 9/19 | Creighton | 336—60 |
| 1,360,752 | 11/20 | Johanneson | 336—198 X |
| 1,529,570 | 3/25 | Bethke | 336—60 X |
| 1,624,896 | 4/27 | Veitch | 336—60 |
| 2,196,026 | 4/40 | Piercy | 174—25 |
| 2,355,477 | 8/44 | Stahl | 336—198 X |
| 2,444,737 | 7/48 | Heath | 336—208 X |
| 3,019,375 | 1/62 | Geyer et al. | 336—198 X |
| 3,083,930 | 4/63 | Brekke | 336—198 X |

JOHN F. BURNS, *Primary Examiner.*

MILTON O. HIRSHFIELD, *Examiner.*

UNITED STATES PATENT OFFICE
CERTIFICATE OF CORRECTION

Patent No. 3,213,397                                  October 19, 1965

Michael Broverman

It is hereby certified that error appears in the above numbered patent requiring correction and that the said Letters Patent should read as corrected below.

Column 1, line 17, for "of", second occurrence, read -- on --; column 5, line 73, after "grooves" insert -- extending --; column 6, line 6, after "providing" insert -- grooves --.

Signed and sealed this 26th day of July 1966.

(SEAL)
Attest:

ERNEST W. SWIDER                                      EDWARD J. BRENNER
Attesting Officer                                            Commissioner of Patents